United States Patent [19]  [11]  4,036,923
Saidla  [45]  July 19, 1977

[54] METHOD FOR FORMING LARGE REINFORCED FOAMED PLASTIC PANELS

[75] Inventor: Glen E. W. Saidla, Hampton Falls, N.H.

[73] Assignee: Exxon Research and Engineering Company, Linden, N.J.

[21] Appl. No.: 554,681

[22] Filed: Mar. 3, 1975

[51] Int. Cl.² ........................................... B29D 27/04
[52] U.S. Cl. ................................. 264/45.3; 264/40.5; 264/46.5; 264/46.6; 264/261; 264/316; 264/DIG. 17; 425/817 R; 428/71; 428/160; 428/310
[58] Field of Search ................. 264/54, 48, 46.5, 261, 264/316, DIG. 17, 45.3, 46.6, 40.5, 331, 46.5; 249/122; 259/4 R, 4 AB, 4 A; 425/817 R; 428/71, 160, 310; 101/401.1

[56] References Cited
U.S. PATENT DOCUMENTS

| 3,090,078 | 5/1963 | Ackles | 264/45.8 |
| 3,256,218 | 6/1966 | Knox | 264/54 X |
| 3,382,302 | 5/1968 | Marzocchi | 264/54 X |
| 3,639,553 | 2/1972 | Sueda et al. | 264/90 |
| 3,929,318 | 12/1975 | Saidla | 259/4 AB |

FOREIGN PATENT DOCUMENTS 1,212,785 11/1970 United Kingdom ................. 264/331

OTHER PUBLICATIONS

Musgrave, Ivor "Modern Methods of Moulding Urethane Foams," In *Journal of Cellular Plastics*, July-/Aug., 1969, pp. 225-231.

*Primary Examiner*—Philip Anderson
*Attorney, Agent, or Firm*—Joseph J. Dvorak

[57] ABSTRACT

A method and apparatus for forming large fiber-reinforced foamed plastic panels is disclosed. The panels are produced by a process comprising filling a flat mold with freshly mixed foam plastic precursors, including fibrous material for reinforcement of the panels, closing the mold until the plastic precursors have foamed and set, then opening the mold and removing the finished panel. The apparatus comprises a platen mounted for traversing under the dispensing outlet of a mixing device, whereby the platen is filled with foamed plastic precursors, and a press into which the platen travels before the mixture has begun to mold. The press is provided with a novel mechanism for closing the mold by placing a cover on top of the platen before the plastic begins to foam. The same mechanism is adapted to open the mold by lifting the platen cover. Thereafter, the platen is moved in a reverse of its entry movement, returning to its starting position for removal of the finished panel. The mechanism for opening and closing the mold is operated by hydraulic operators under the supervision of a sequencing controller which provides a tilting movement during operation, providing for expelling of air during closing of the mold and breaking the surface tension between the platen cover and the finished panel by first raising or peeling one corner of the platen so as not to lift the panel out of the mold.

5 Claims, 15 Drawing Figures

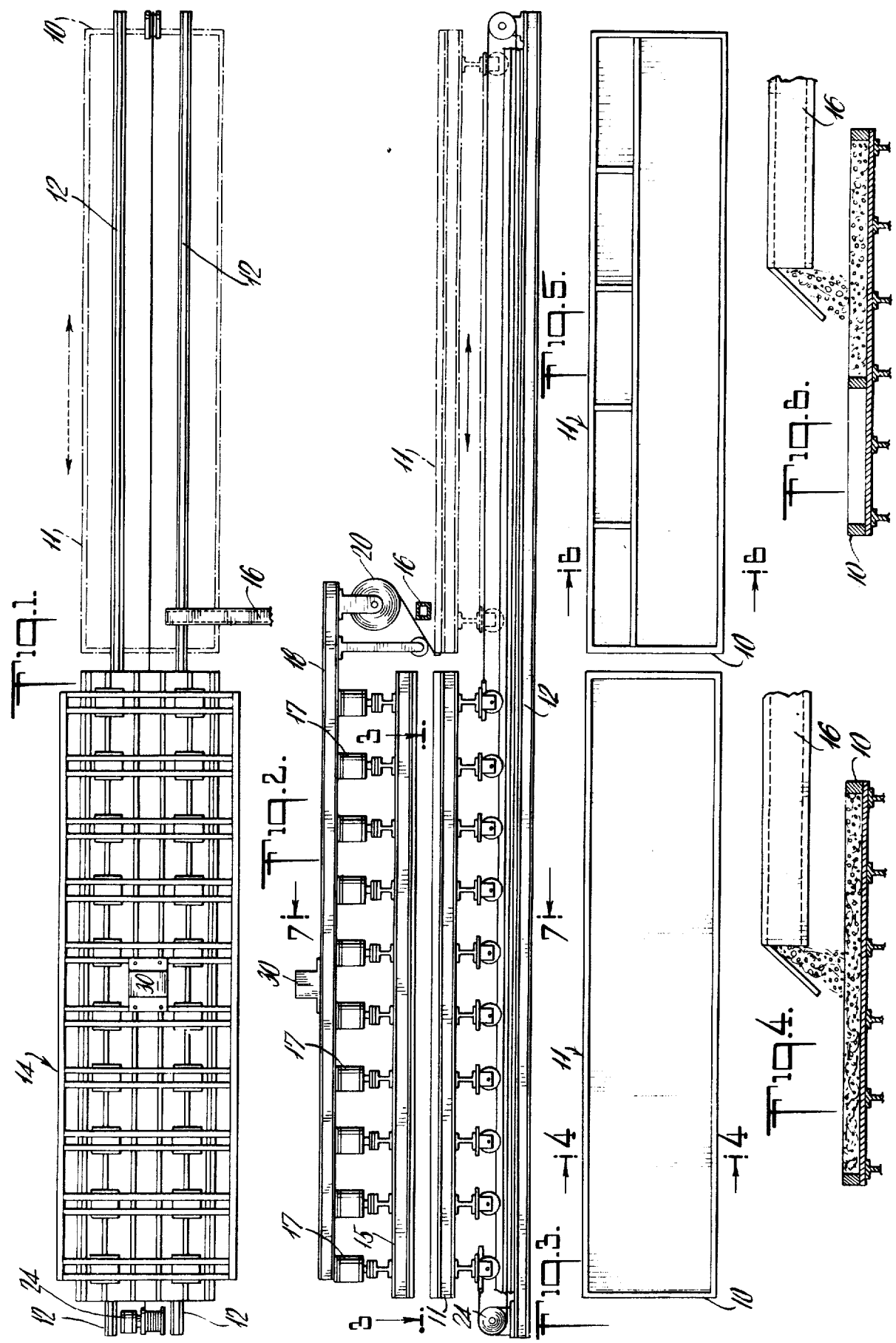

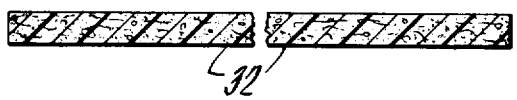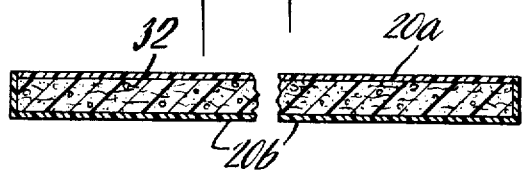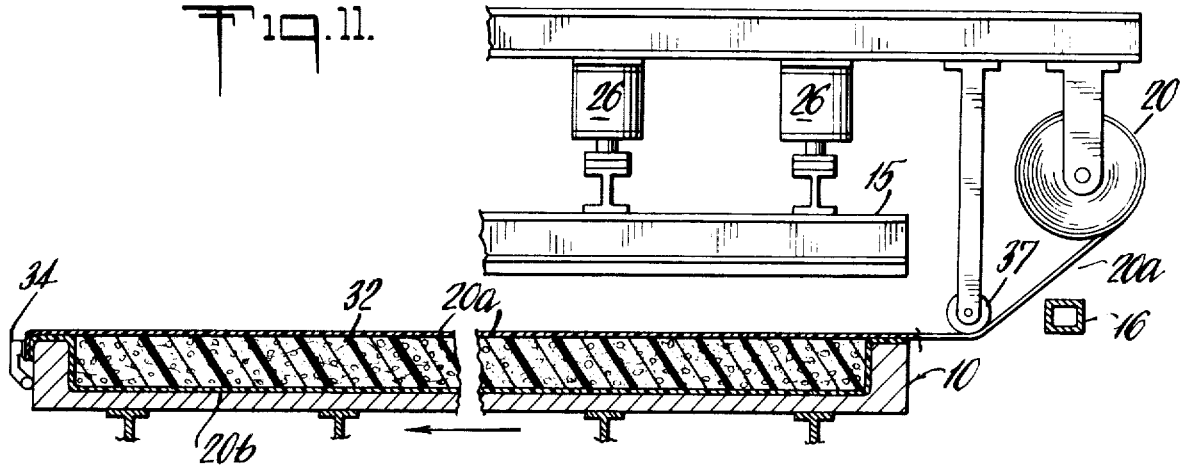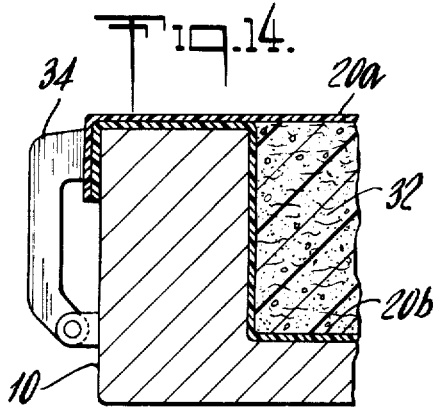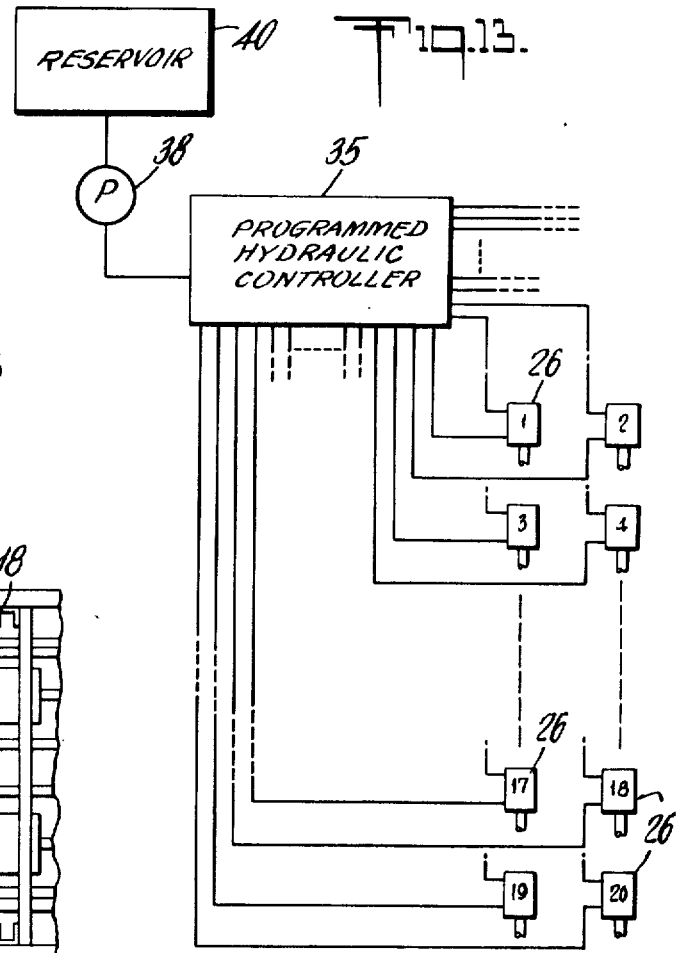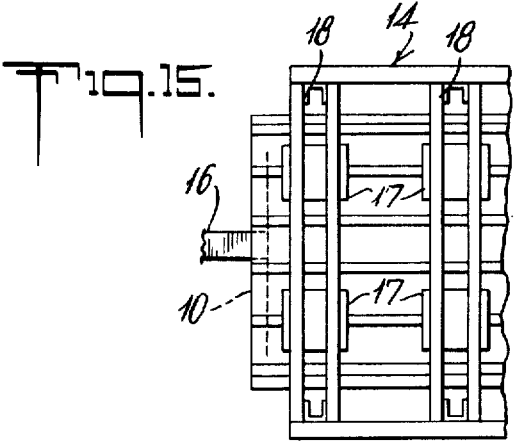

METHOD FOR FORMING LARGE REINFORCED FOAMED PLASTIC PANELS

BACKGROUND OF THE INVENTION

In a prior application, Ser. No. 407,829, filed Oct. 19, 1973 of applicant and assigned to the assignee of the present application, and now abandoned, a process was disclosed for forming fiber-reinforced foamed plastic articles such as glass fiber reinforced polyurethane articles. The present application discloses an apparatus for carrying out on a large commercial scale one aspect to that prior process invention. In U.S. Pat. No. 3,929,318, a mixer is disclosed for preparing foamed plastic precursors with fiber reinforcement immediately prior to dispensing that mixture into a mold where fiber-reinforced foamed plastic articles are formed. The above prior application and patent are related to the present application and are incorporated by reference herein.

The formation of large, flat fiber-reinforced panels in a one-step process is a unique operation, not heretofore carried out commercially. Accordingly, no significant prior art is known which is pertinent to the method and apparatus for forming such panels as to be disclosed herein. The most important problems to be met in producing these panels may be outlined as follows.

It is typical of such foamed plastic precursors that within thirty seconds after being mixed they begin to foam. Accordingly, in thirty seconds the mold into which the precursors are placed must be completely filled and closed. Thus, it is an essential feature of a mold for forming flat panels that it be filled very quickly and uniformly. In addition, such a mold must close quickly and at the same time avoid trapping air inside which could cause substantial defects in the panels which are produced. In this regard, it should be noted that in typical commercial application panels of approximately 10 × 45 feet and ¼ inch and greater thicknesses can be produced. It will be appreciated that distribution of foamed material across such an extensive flat area can be a substantial difficulty in the formation of such panels. After filling, the mold must also be held closed against the force exerted by the foaming material in order to create a uniform panel. Since the material fills the mold cavity fully, adherence of the panel to the mold body may cause difficulties. It is essential that the mold be openable without damage to the panel.

SUMMARY OF THE INVENTION

A method have been invented for forming large fiber-reinforced foamed plastic panels. The method of forming such panels involves the steps of transporting a horizontally disposed platen beneath the discharge of a mixer for receiving the pre-mixed precursors of the reinforced foamed plastic, including the fiber reinforcement mixed therein. After the mold has been filled by being transported beneath the discharge of the mixer, it is moved into place within a hydraulic press. There, the platen is closed by lowering a top onto it in such a manner that air is expelled and thereby forming a closed, flat mold. The mold is kept closed for a time sufficient for the foaming and setting of the plastic precursors, forming a rigid foamed plastic fiber-reinforced panel. After the setting of a panel, the mold is opened by lifting the cover of the platen in such a manner that no damage to the finished panel results. Thereafter, the platen containing the finished flat panel is transported to a removal station where the finished panel is lifted from the platen.

In an alternate form of the invention, discharge of the mixer may be located at one edge of the mold with the top platen already in a closed position. Thereafter, upon discharge of the foamable plastic mixture from the end of the mixer, the mixture will be injected under high pressure throughout the mold cavity to form the finished panel. As in the previous embodiment, the finished panel may be thereafter removed from the mold by lifting of the top mold platen.

Additional features of the method include controlling the time of filling of the platen to the induction period of the foamed plastic material, typically about 30 seconds. In an alternative method of the invention, the platen is lined with a sheet plastic material to incorporate the plastic material as an additional surface on the finished flat panel.

An apparatus to be described in more detail hereinafter has been invented which will carry out the method of the invention. In one important aspect, the apparatus includes a hydraulic sequencing system operating the platen top whereby the top is placed atop and lifted from the platen in a tilted or peeling relationship so that air is not trapped in the mold during closing and so that the surface tension between the panel and top platen is easily broken during mold opening.

The foregoing summary of the invention will be more clearly understood in light of the detailed description which follows.

BRIEF DESCRIPTION OF THE FIGURES

FIG. 1 is a top plan view of the press and platen.

FIG. 2 is a side elevation view similar to that of FIG. 1.

FIG. 3 is a view of the platen taken substantially along line 3—3 of FIG. 2.

FIG. 4 is a view of the mixer and platen taken substantially along line 4—4 of FIG. 3.

FIG. 5 is a top plan view of a modified form of platen for molding smaller size panels.

FIG. 6 is a view of the mixer and platen taken substantially along line 6—6 of FIG. 5.

FIG. 10 is a cross-sectional view of the panel.

FIG. 11 is an enlarged fragmentary view of the machine of FIG. 2 showing the film dispenser in more detail.

FIG. 12 is a cross-section of a panel including an integral plastic film skin.

FIG. 13 is a highly schematic view of the hydraulic system for operating the press.

FIG. 14 is an enlarged view of one end of the panel mold of FIG. 11 showing the arrangement of the plastic skin about the edge of the panel.

FIG. 15 is a top plan view of one end of the press and platen showing an alternate injection method for introducing the foamable plastic in the mold.

DESCRIPTION OF THE PREFERRED EMBODIMENT

Figure 7:
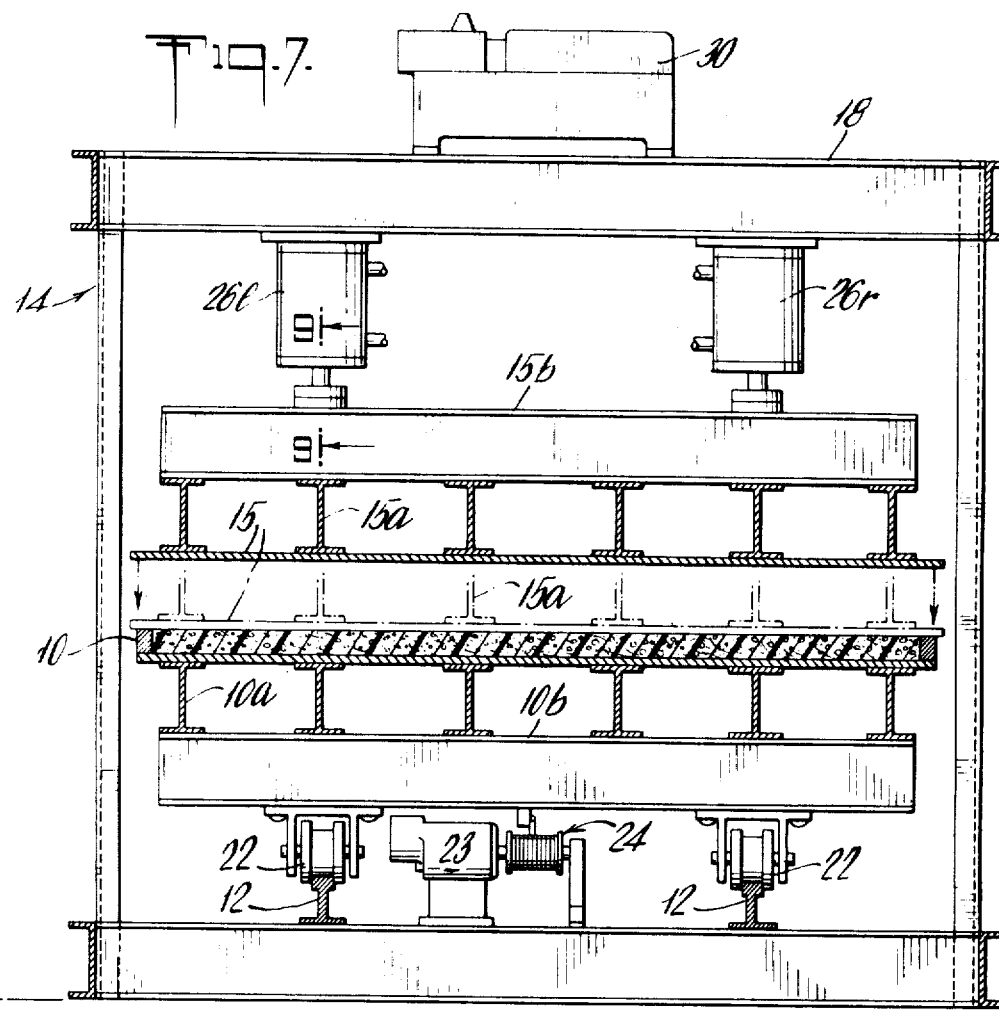
FIG. 7 is a sectional view of the press and mold taken substantially along line 7—7 of FIG. 2 during the closing of the platen.

The preferred embodiment will be discussed in connection with a commercially useful apparatus for carrying out the method of the invention and which can produce large foamed fiber-reinforced flat panels, which may be in one particular instance 10 × 45 feet and one quarter inch and up in thicknesses. When it is considered that such a panel must be formed in a "one shot" operation wherein a large flat mold is filled with a foamable plastic mixture which will foam in about 30 seconds after it is mixed, it will be appreciated that placing the pre-mixed plastic materials within the mold and closing it within a very short period of time is extremely critical. Also, it should be understood that in a typical embodiment the mixture of foamed plastic precursors and reinforcing fibers is viscous, thus making difficult the disposition of the foaming material into the mold. With these problems in mind, one can proceed to a discussion of the drawings.

FIG. 1 shows a plan view of an apparatus according to the invention or producing large flat foamed plastic panels containing integral reinforcing fibers. The bottom half of the mold, also called a platen 10, is horizontally mounted on tracks 12 on which the platen 10 can be transported into position within the press, shown generally as 14. At the beginning of a panel forming cycle, the platen is disposed outside the press 14, at the right-hand side of the drawing as indicated. The pre-mixed foam plastic precursors will be discharged from a mixer 16 mounted near the extreme left end of the platen 10 in FIG. 1. This mixer 16 is the subject of a referenced U.S. Pat. No. 3,929,318 where a detailed description may be found. It is sufficient to say here that the mixer 16 discharges uniformly mixed foam plastic precursors, including reinforcing fibers, at a high rate onto the platen 10. The platen 10 must be completely filled within approximately thirty seconds since that is the time in which the foamed plastic will begin to foam in the mold. This short induction period is a severe limitation in the formation of such large panels. According to the invention, the platen 10 is transported horizontally to the left (in FIG. 1) under the mixer 16 and filled until, at the completion of the fill, the platen 10 has been transported into position under the press 14. Thereafter, the press 14 lowers a top 15 onto the platen 10 in such a manner as to expel air which might otherwise be trapped therein and then holds the top closed, forming a closed mold for a flat panel until the plastic materials have fully foamed and set.

FIG. 2 shows an elevation view substantially corresponding to that of FIG. 1 in which the process just briefly described may be more readily followed. The platen 10, mounted on a wheeled carrier 11 is transported along tracks 12 from its starting position under the mixer 16 and into position under the press 14. The top 15 is then placed on it by means of a plurality of hydraulic operators 17 mounted on the upper portion of the frame 18. Viewing FIGS. 1 and 2 together, it will be appreciated that a substantial frame, typically made of I-beams, supports the transporting mechanism, the platen 10 and the platen top 15 as well as providing a rigid frame against which the hydraulic operators may exert their force.

Just above the mixer 16 in FIG. 2 an additional feature has been shown, not illustrated in FIG. 1. In an alternative embodiment, the panel may be covered with a film plastic skin. For this purpose, a roll of film 20 is shown mounted on the upper portion 18 of the frame. A further sheet of film 20b is stretched over the bottom of the platen before it is filled (see FIGS. 11 and 14). As the platen 10 is transported under the mixer 16 to receive the premixed foam plastic precursors, the film is laid down over the top of the platen 10 as it is passed into the press 14. Once the filling of the platen 10 has been completed, the film can be cut off after the top has been placed on the press with the film trapped in position so that it will appear as a skin on the top, bottom and edges of the finished panel. Thus, the entire panel can be covered with a film plastic of material, which is advantageous for some applications where an integrally bonded sheet plastic surface coating of any color is desired. Of course, if other surface materials were desired on the finished panels, a thin metal sheet or foil, fabric, or composition sheet could be substituted for the illustrated sheet plastic surface.

FIGS. 3 and 5 illustrate two alternative forms of the platen of the invention. The platen of FIG. 3 will produce a simple rectangular flat panel when it is filled with a mixture of foam plastic precursors having fiber mixed therein. In FIG. 5, a segmented platen is illustrated having internal dividers whereby a panel of varied dimensions may be produced. The platens of FIGS. 3 and 5 are shown in FIGS. 4 and 6, being filled by the discharge of the static mixer 16 of the referenced invention. The foamable plastic mixture is sufficiently resilient so as to spread and fill the mold 10 as illustrated in FIG. 4 when the platen top 15 is lowered into place immediately after the foaming cycle is started. The roller 37 while guiding the top film 20a is also effective to assist in the spreading of the foamable plastic to the edges of the mold prior to closing of the platen top 15. The volume of the mixture discharged onto the large rectangular area of the mold of FIG. 5 will naturally be less than that necessary for the FIG. 4 mold due to the reduced size of the panel made.

FIG. 7 shows in cross-sectional view the structure and operation of the press 14. The surrounding box frame structure 18 is more clearly seen in this view. The platen 10 in which a foamed panel is formed is illustrated in position within the structure of the press 14. It is supported on I-beams 10a which in turn rest upon other cross beams 10b which together form a carriage for transporting the platen 10 from the starting station into the press. The carriage is mounted upon rollers 22 which engage tracks 12 which position and support the platen 10 during the panel forming process. The drive motor 23 and cable system 24 may be seen in part also in FIG. 2. This drive means serves to either pull the platen 10 on its carriage into the press 14 under the discharge end of the mixer 16 or, alternatively, moves the platen 10 out of the press into the starting position for removal of the finished panel. Such a reversal of direction can be accomplished in any number of ways, perhaps the simplest being use of a motor which electrically reverses direction.

It is necessary to confine the foamable material within the mold while foaming takes place and until setting is achieved. This is accomplished by placing a top 15 over the platen 10. This top 15 may be a simple plate as shown in FIG. 7, reinforced by I-beams 15a to assure a truly flat plate, or some other structure might be used. In FIG. 7, cross beams 15b provide additional rigidity to the top structure. A plurality of hydraulic operators 26 are attached to these cross beams 15b. The hydraulic operators 26 move the top 15 and its supporting structure in an up or down movement as necessary to close or open the mold. It will be clear that trying to place a single large flat sheet 15 over a shallow platen 10 may trap air within the mold, causing discontinuities in the finished panel. This air which could be trapped must be released. According to the invention, a method of accomplishing this is to lower the top 15 with one edge lower than the other. In such an attitude the lower edge of top 15 will touch the platen 10 first. Then the top is lowered into position and sweeps out the air which could be trapped within the platen. Individual control of the hydraulic operators 26 makes this possible. Because of the extremely rapid induction period, after which the foaming begins to take place, it has been found desirable in forming such large panels for the narrow end of the panel which first enters the press to be contacted first with the top 15 so that the end of the platen in which foaming begins is covered first. Accordingly, a portion of the platen 10 which enters the press last, that is the opposite end, is covered last just before the foaming process begins. By proper programming of the hydraulic operators 26 it is possible to achieve such a selective closing of the top onto the platen 10 to achieve a closed mold. In practice it has been found desirable to start closing of the mold by lowering one corner of the top plate first and finish the closing of the mold by closing the diagonally opposite corner of the plate 15 last. The great force that can be applied by the activators 26 in this way will assure that the mold charge is quickly and uniformly squeezed into all four corners and sides of the mold prior to and during the time that the chemical foaming reaction takes place. The hydraulic operators 26, being mounted on the upper cross beams 15b of the surrounding box frame 14 are able to exert a force against the frame 14 in raising or lowering the platen top 15. The hydraulic system 30 has typically placed atop the surrounding box structure, a portion of which may be seen in FIG. 7.

Figures 8, 9:
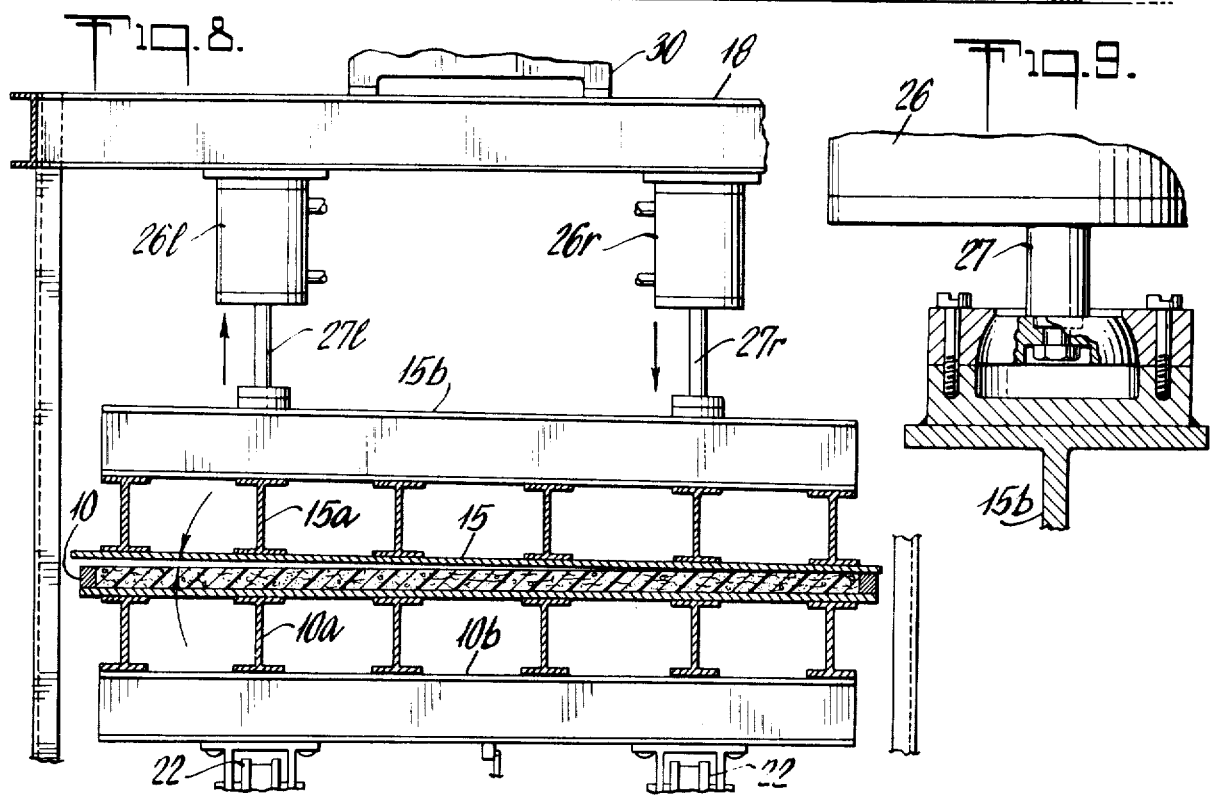
FIG. 8 is an enlarged sectional view of the press during the opening of the platen.
FIG. 9 is a sectional detail along line 9—9 of FIG. 7.

While the mold is closed by setting the platen top 15 down one edge or corner first and then lowering the remainder of the top 15, a somewhat similar process occurs during the removal of the top 15 after the formation of the foamed panel. This is illustrated in FIG. 8. One edge or corner of the platen top may be lifted first. This has the double advantage of preventing damage to the panel and at the same time reducing the amount of effort required in order to lift the top. It will be appreciated that if the mold is completely full, as it will be after the panel is set, that the air pressure on top of the platen top will be substantial and a vacuum could be created in attempting to lift the top which would require a very large force to overcome. By lifting one edge instead, any potential vacuum is broken by the in-rush of air and it is possible to lift the top 15 solely against its own weight with a little resistance from the adhesion of the panel to the platen top. Again, as in FIG. 7, the operation of FIG. 8 requires a coordinated programming of the operation of the hydraulic operators 26 which is illustrated in a schematic control diagram, FIG. 13.

FIG. 9 illustrates a semi-ball and socket construction used at the end of the hydraulic operators which permits the unequal applying of force as is required for the programmed lifting of the platen top. The operator shafts obviously can only move in a vertical direction. If, as in FIG. 8, for example, the left-hand operator 26l is to move upward while the right operator 26r is to have little or no movement it is necessary that the connection of the operators shafts 27l and 27r to the supporting beams 15b must be flexible in nature. This is provided by the structure shown in FIG. 9 wherein a curved ball and socket member 28 is free to move to accommodate the angle developed by the top 15 as it is lifted from one side.

In FIG. 10, a cross-section of a finished panel 32 is shown. This panel will contain distributed reinforcing fibers throughout the rigid mixture disposed therein as desired and established by the conditions under which the materials are mixed. This fiber distribution in the foamed panel is the general subject of application Ser. No. 407,829 to which reference has been made. Such a panel is useful for many applications. However, as previously mentioned, there may well be applications in which an integral plastic film 33 serving as the skin of such a panel would be desirable. Such applications would, for example, be for decorative structural building panels or tractor trailer roof and side panels where high strength, durability and appearance is desired.

Formation of such skinned pannel has been discussed previously in connection with FIG. 2.

FIG. 11 illustrates in more detail the plastic film dispensing means which was discussed in connection with FIG. 2. The film 20a can be clamped in place on one edge of the platen 10 by clamp 34 and then simply pulled out as the platen 10 is horizontally transported beneath the mixer 16 and into position in the press. In the illustration of FIG. 11, it will be observed that the platen 10 is first covered with a bottom sheet of stretched film 20b and subsequently positioned in the press 14 as the platen 10 is completely covered by the stretched film 20a. At this point the platen 15 will be lowered onto the platen 10 to close it and form a closed mold. Thereafter, the film may be cut off during the setting period.

FIG. 13 schematically illustrates the control system by which the hydraulic operators 26 are programmed sequentially and activated in order to accomplish the tilted attitude required during the raising and lowering of the platen top 15 as previously described. The arrangement of FIG. 13 includes a programmed hydraulic controller or sequencing mechanism 35 connected to the actuators 26 by a plurality of pressure and return lines 36. The necessary hydraulic pressure is supplied by a pump 38 connected to a fluid reservoir 40. The controller 34 will be understood to include all the necessary valves, timing devices, etc. to accomplish the desired programmed upward and downward actuation of the operators 26 during the panel molding cycle.

FIG. 14 shows an enlarged end section of the bottom leading edge of the platen to better show a manner in which the upper and lower plastic sheets 29a and 20b are secured with an end slip 34. In practice, if desired, the bottom sheet 20b may be stretched over the platen 10 and secured thereto with the use of masking or adhesive tape or any other suitable means.

In FIG. 15, an alternate form of foamable plastic introduction means is shown. In this embodiment, the same mixer nozzle 16 as is shown in the first embodiment has been relocated to the left end of the machine shown in FIG. 1 and arranged to directly inject the plastic mixture into the mold cavity. In this arrangement, the injection would naturally only commence with the mold in a closed position, and during injection the trapped air in the mold would be expelled from the opposite end or from additional vents which could be placed about the edges of the mold cavity as required.

The foregoing description of the preferred embodiment is for illustration and explanation of the invention and should not be construed to limit the scope thereof which is defined by the claims which follow:

What is claimed is:

1. A method of forming a large flat foamed plastic panel from a foamable thermosetting resin reaction mixture which will foam in about 30 seconds after said mixture is formed comprising the steps of:
   a. transporting an open horizontally disposed mold having a raised boundary edge defining a cavity therein beneath the discharge of a mixer while said mixer discharges the foamable mixture into the cavity of said mold within about 30 seconds, the amount of resin mixture discharged being sufficient that upon foaming the foamed resin will fill the mold;
   b. continuing the transport of said mold past the discharge end of said mixer to place said mold in position within an adjacent molding press having a mold cover therein;
   c. lowering said mold cover atop said mold into contact with said raised boundary edge thereby forming a closed flat mold, said lowering being effected progressively beginning first at one corner of the end of the mold first transported into the molding press and continuing diagonally toward the opposite end thereof by a plurality of sequentially activated operators whereby trapping of air thereunder is prevented;
   d. holding the mold closed for a time sufficient for foaming and setting of the foamable mixture;
   e. raising the cover from contact with the raised boundary edge, said raising being initiated at one corner of said mold and contintuing diagonally to the opposite end thereof by a plurality of sequentially activated operators to progressively peel the cover from said panel whereby damage to the foamed panel is prevented; and
   f. returning the opened mold to its initial position.

2. A method of forming a large fiber reinforced foamed plastic flat panel comprising the steps of:
   a. transporting a horizontally disposed mold having a cavity therein beneath the discharge of a mixer;
   b. discharging from said mixer into said mold cavity a foamable thermosetting resin reaction mixture containing fibers intermixed therein while said mold is transported by step (a), the amount of foamable resin mixture dicharged being sufficient that upon foaming the foamed resin will fill the mold, said discharging being completed before foaming of the resin takes place;
   c. continuing the transport of the mold of step (a) until said mold is positioned within a molding press, having a mold cover therein;
   d. lowering the mold cover atop said mold thereby forming a closed flat mold, said lowering being effected progressively beginning first at the end of the mold first transported into the molding press and continuing toward the opposite end thereof by a plurality of sequentially activated operators whereby trapping of air thereunder is prevented;
   e. holding the mold of step (d) for a time sufficient for foaming and setting of the foamable mixture of step (b) to form a rigid foam fiber reinforced panel;
   f. opening said closed mold by lifting the corner of said mold cover lowered in step (d), said lifting being initiated at one corner of said mold and continuing to the opposite end thereof by a plurality of sequentially activated operators to progressively peel the cover from said mold whereby damage to the foam panel is prevented;
   g. transporting said open mold of step (f) to the initial position of (a); and
   h. removing the panel of step (e) from said mold.

3. The method of claim 2 wherein the time of discharging said mixer is about 30 seconds.

4. The method of claim 2 further comprising the step of lining the bottom of said mold with plastic film prior to the discharge of the resin mixture into the mold.

5. The method of claim 2 further comprising the step of covering the foamable mixture after the discharge thereof of step (b) with a plastic film and prior to the closing of the mold of step (d).

* * * * *